United States Patent [19]

Younger

[11] Patent Number: 5,624,342

[45] Date of Patent: Apr. 29, 1997

[54] METHOD FOR MODIFYING AN ORIGINAL AUTOMATIC TRANSMISSION

[76] Inventor: Gilbert W. Younger, 2621 Merced Ave., El Monte, Calif. 91733

[21] Appl. No.: 494,844

[22] Filed: Jun. 26, 1995

[51] Int. Cl.$^6$ .................................................. F16H 61/26
[52] U.S. Cl. ........................................ 475/127; 475/116
[58] Field of Search ................................. 477/127, 130, 477/137; 475/116, 118, 120

[56] References Cited

U.S. PATENT DOCUMENTS

| | | | |
|---|---|---|---|
| 4,449,426 | 5/1984 | Younger | 477/127 |
| 4,513,640 | 4/1985 | Stevenson | 477/127 |
| 4,711,140 | 12/1987 | Younger | 477/156 |
| 4,790,938 | 12/1988 | Younger | 210/484 |
| 5,235,549 | 8/1993 | Younger | 475/146 |

OTHER PUBLICATIONS

GM Hydramatic THM200–4R, "Principles of Operation", 1st Ed., pp. 1–92, Copyrighted by GM Corp. 1980.
Transgo(R) 200/4R–2&3 Reprogramming Kit (TM), pp. 1–8.

*Primary Examiner*—Khoi Q. Ta
*Attorney, Agent, or Firm*—Mark P. Stone

[57] ABSTRACT

The present invention is directed to methods and systems for improving the operation of a transmission for an automotive vehicle, and in particular the transmission as installed by the original automobile manufacturer. The methods and systems of the present invention modify the original hydraulic fluid circuits of the automotive transmission provided by the automobile manufacturer to enable the transmission to select any available ratio at any time, and to enable the transmission to produce quick applies during upshifts and fast releases during downshifts for improved performance and heavy duty use with only minimum ratio sharing or overlap during gear changes. The modification of the original automotive transmission to achieve these goals includes adjustment of the hydraulic fluid circuits by providing a new low control valve, by providing new hydraulic flow circuits, by discontinuing use of existing hydraulic circuits, by enlarging the size of pre-existing orifices and by plugging other orifices, and by adjusting pre-existing spring and pressure values; all of which adjust the fluid flow and operation of the original factory installed automotive transmission in accordance with the basic objectives of the present invention.

20 Claims, 12 Drawing Sheets

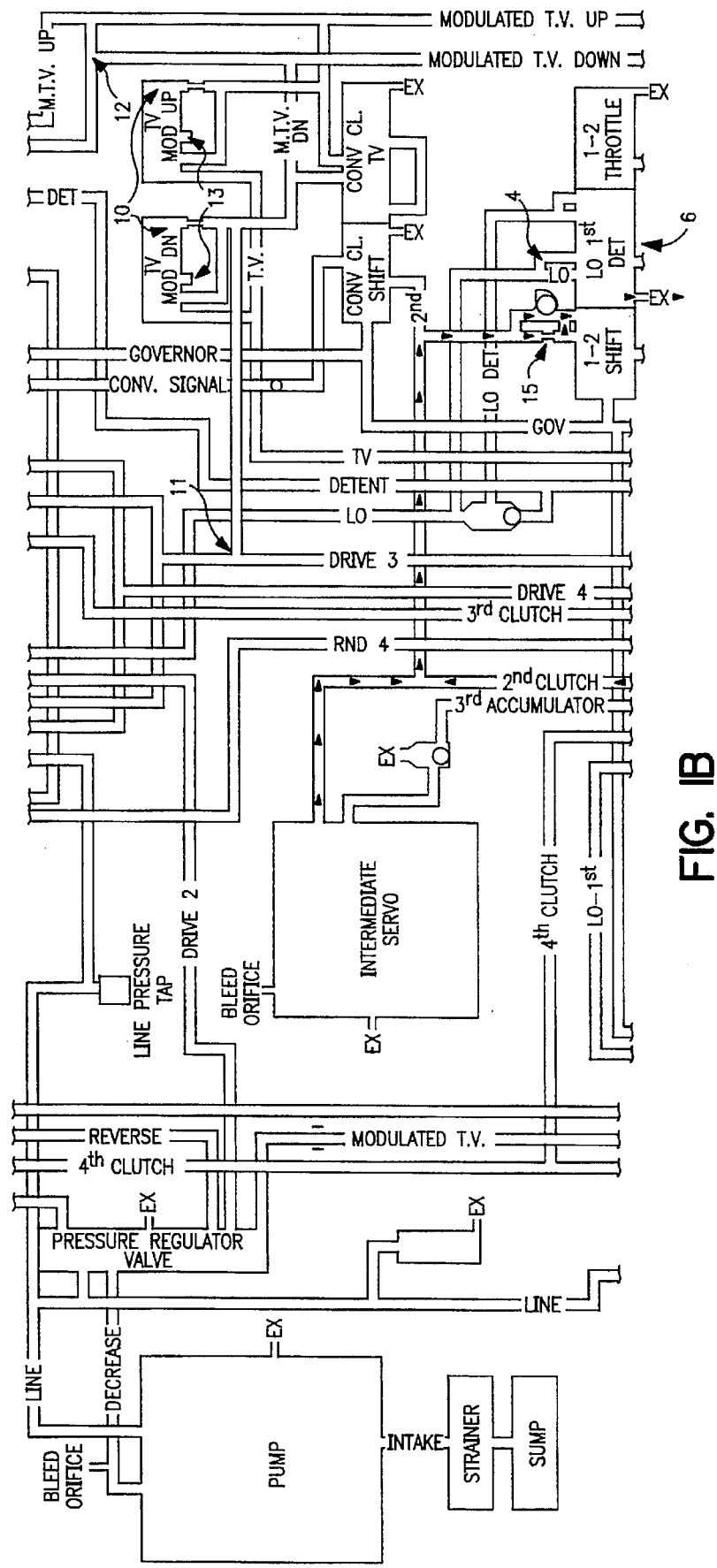
FIG. IB

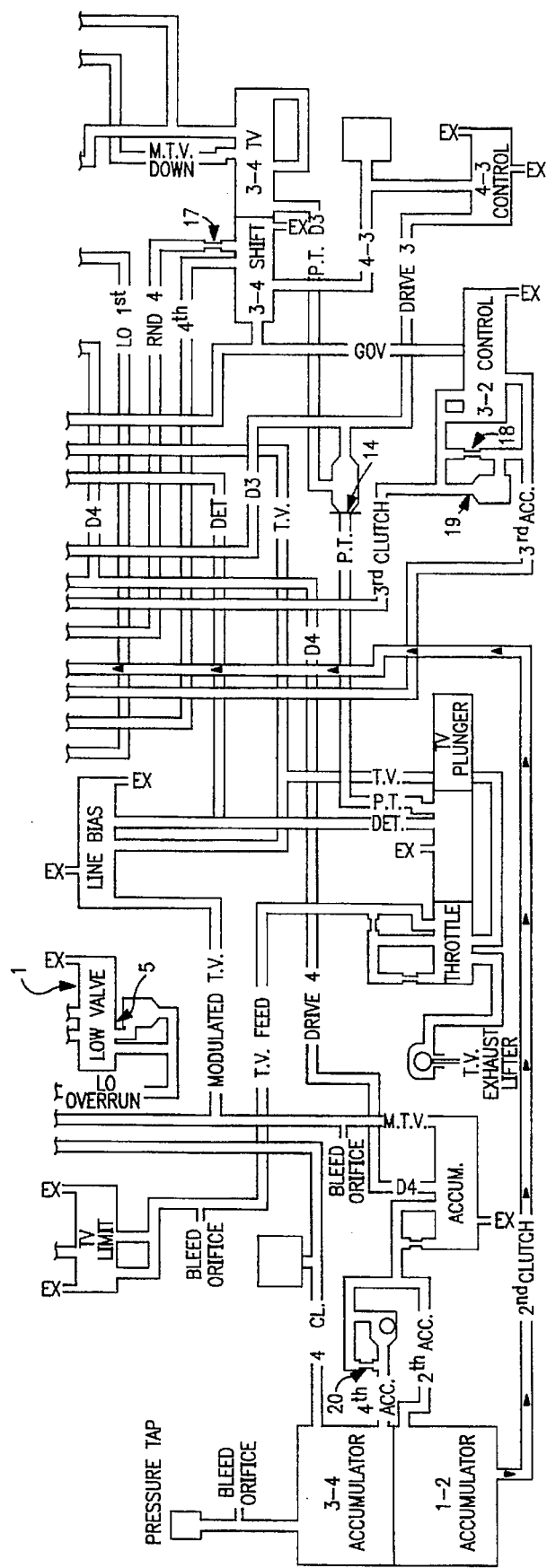
FIG. IC

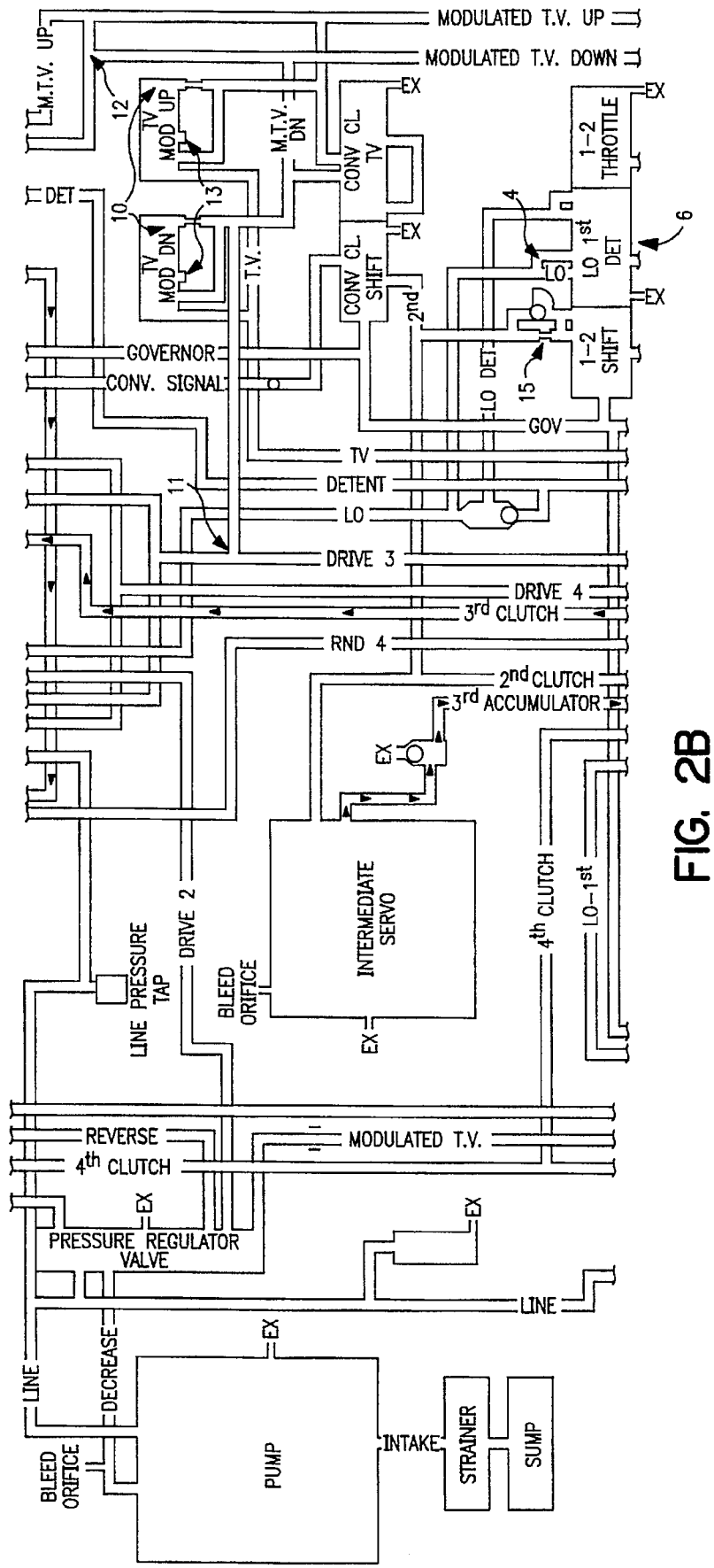

1

METHOD FOR MODIFYING AN ORIGINAL AUTOMATIC TRANSMISSION

BACKGROUND OF THE INVENTION

The methods and systems of the present invention are directed to the modification and improvement of transmissions for automotive vehicles of the type installed by the original equipment manufacturers. The invention is particularly directed to the improvement and modification of the automotive transmissions commonly known as the 200/4R-3 [manually operated] and the 200/4R-2 [automatic], both of which are "factory installed" in automotive vehicles manufactured by General Motors Corporation.

The present inventor owns U.S. Pat. No. 5,253,549, issued Oct. 19, 1993 and entitled "Methods And Systems For Improving The Operation Of Automatic Transmissions For Vehicles"; U.S. Pat. No. 4,790,938, issued on Dec. 13, 1988 and entitled "Filter For Removing Particulate Matter From Fluid Within A Movable Body"; U.S. Pat. No. 4,711,140, issued Dec. 8, 1987 and entitled "Throttle Valve System For Automatic Transmission"; U.S. Pat. No. 4,449,426, issued on May 22, 1984 and entitled "Laminated Separator Plate Means For Recalibrating Automatic Transmission" and U.S. patent application Ser. No. 08/333,552, filed Nov. 2, 1994 and entitled "Methods And Systems For Improving The Operation Of Transmissions For Motor Vehicles". The basic operation of transmissions for automotive vehicles is discussed in the aforementioned patents and patent application, and these patents and patent application are expressly incorporated by reference into the disclosure of the present patent application.

The basic principles of operation of the factory installed GENERAL MOTORS® 200-4R-2 and 200-4R-3 transmissions for automotive vehicles, including the specific modes of operation thereof and the hydraulic circuits and interrelationship of hydraulic circuits, are well known to those skilled in the automotive transmission art. Attention is respectfully invited to the operations manual and text entitled *THM 200-R4, PRINCIPLES OF OPERATION*, First Edition, (1980), published by General Motors Corporation, said publication describing in detail, among others, the operation of the "factory installed" 200-4R-2 and 200-4R-3 GENERAL MOTORS® transmissions, including a discussion of the structure, the hydraulic circuits, and the interrelationship between the structure and the hydraulic circuitry and fluid flow during normal operation of the transmissions in automotive vehicles. The disclosure of the aforementioned publication in its entirety is expressly incorporated by reference into the disclosure of the present patent application as disclosing and illustrating background material known to those of ordinary skill in the automotive transmission art.

Attached hereto as an Appendix is a publication entitled "TRANSGO 200/4R-2 & 3 REPROGRAMMING KIT", an instruction sheet describing the manner in which an automotive transmission mechanic implements the modifications to the 200/4R-2 and 200/4R-3 General Motors Corporation factory installed transmissions to achieve the goals of the present invention. The disclosure of the aforementioned instruction sheet in its entirety is also expressly incorporated by reference into the present patent application.

In the original design of the 200/4R-3 "factory installed" transmission, the first gear ratio cannot be obtained above a vehicle speed of approximately 28–30 miles per hour. (See the aforementioned GENERAL MOTORS Corporation publication). A primary object of the present invention is to enable the driver of the vehicle having a 200/4R-3 GENERAL MOTORS® transmission to select any available gear ratio at any time, thereby enabling the driver to obtain a "first" gear ratio whenever the gear selector lever is placed in the "1" position. This objective is accomplished by modification of the structure and operation of the existing hydraulic circuits of the original transmission and the addition of a new hydraulic circuits to the original transmission.

It is also desirable to modify the "factory installed" automotive transmission to result in quick application during upshifts and quick release forces during downshifts with minimum ratio sharing (overlap) during gear changes, for improved performance particularly when the vehicle is in heavy duty use. This object is obtained by varying the structure and operation of the hydraulic circuits of the original transmission to enlarge or reduce existing orifices to control the apply and release fluid flow through the hydraulic circuits, in conjunction with the modification of different spring and pressure values of the pre-existing hydraulic circuits of the factory installed transmission.

Other objects, improvements and advantages of the present invention will become apparent to those skilled in the art from the following description in conjunction with the drawings.

SUMMARY OF THE INVENTION

Methods, apparatus and systems are provided for modifying the structure, operation, and functional relationship between structure in "factory installed" transmissions for automotive vehicles. In accordance with the present invention, the transmissions identified as 200/4R-2 and 200/4R-3 installed in General Motors Corporation vehicles are modified to enable the driver to select any available ratio at any time, and in particular to enable the driver to obtain a first ratio whenever the gear selector is placed in the first position. In the original "factory installed" transmission, the first ratio cannot be obtained for vehicle speeds exceeding approximately 28–30 miles per hour. The original transmission is modified to achieve this result by removing an existing 3-2 control valve from the original hydraulic circuitry, adding a new low control valve to the hydraulic circuits, blocking the governor valve of the pre-existing hydraulic circuits with a plug, adding new fluid flow channels to provide new hydraulic circuitry in the original existing hydraulic circuits, and discontinuing pre-existing original hydraulic circuits by plugging pre-existing openings.

The present invention also modifies the aforementioned "factory installed" automotive transmissions by producing quick "applies" and "releases" with minimum ratio sharing (overlap), which is advantageous in improving performance when the vehicle is used for heavy duty applications. These further modifications to the operation of the original transmissions are achieved by enlarging or reducing (or plugging) orifices in the original hydraulic circuitry to modify fluid flow therethrough for controlling the apply and release fluid flow. Additionally, adjustments are made to spring and pressure values of the original transmission hydraulic circuitry.

Accordingly, the object of the present invention is to modify the operation of existing "factory installed" automotive transmissions, and in particular the General Motors Corporation 200/4R-2 and 200/4R-3 transmissions, to result in changes to the hydraulic circuitry and fluid flow therethrough to enable the driver of the vehicle to select any available ratio at any time, and to also produce quick "applies and releases" which are particularly advantageous for heavy duty applications. Other advantages and improvements of the methods, systems and apparatus of the present invention will become apparent to those skilled in the automotive transmission art from the following discussion in conjunction with the enclosed drawings.

BRIEF DESCRIPTION OF THE DRAWINGS

FIGS. 1A, 1B, 1C illustrate the hydraulic circuitry of the General Motors Corporation 200/4R automotive transmission for "Manual Lo", as modified in accordance with the present invention;

FIGS. 2A, 2B, 2C illustrate the hydraulic circuitry of the General Motors Corporation 200/4R automotive transmission for "Manual Second", as modified in accordance with the present invention;

DESCRIPTION OF THE BEST MODES FOR CARRYING OUT THE INVENTION

The present invention is directed to improvements and modifications to existing "factory installed" automotive transmissions, and in particular the transmissions known as General Motors Corporation 200/4R-2 and 200/4R-3. The objects of the present invention include modification of the structure, hydraulic circuitry, interrelationship of structure and fluid flow patterns through the hydraulic circuitry of the original automotive transmissions for the purpose of 1). enabling driver of the vehicle to select any available ratio at any time, and 2). to control the fluid flow through the hydraulic circuitry in order to produce quick apply forces during upshifts and quick releases during downshifts with minimum ratio sharing during gear changes. The modifications to the original operation and hydraulic circuitry of the "factory installed" automotive transmissions are made by removing structure including original valves, adding structure including new valves, adding new hydraulic circuits to the overall circuitry, discontinuing use of existing circuits by plugging; and modifying the flow through existing hydraulic circuitry by enlarging or reducing the size of fluid flow orifices and adjusting existing spring and pressure values.

The disclosure of the Applicant's prior U.S. Pat. Nos. 5,253,549; 4,790,938; 4,711,140; and 4,449,426 are expressly incorporated by reference into the disclosure of the present patent application. The disclosure of Applicant's currently pending Ser. No. 08/333,552, filed Nov. 2, 1994, is also expressly incorporated by reference into the disclosure of the present patent application. Additionally, the disclosure of the aforementioned General Motors Corporation operating manual entitled *THM 200-R4, PRINCIPLES OF OPERATION*, First Edition (1980), which discloses in detail the structure and operation of the "factory installed" General Motors Corporation 200/4R-2 and 200/4R-3 automotive transmissions, is expressly incorporated by reference into the disclosure of the present patent application as describing and illustrating basic operating principles and the hydraulic circuitry of the known automotive transmissions which constitute background information to the improvements of the present invention. The attached instruction sheet entitled "TRANSGO 200/4R-2 & 3 REPROGRAMMING KIT", which is attached as an Appendix to the present patent application and which describes the manner in which the known conventional automotive transmissions are modified in accordance with the present invention, is also expressly incorporated by reference herein and forms part of the disclosure of the present patent application.

Figure 1A:
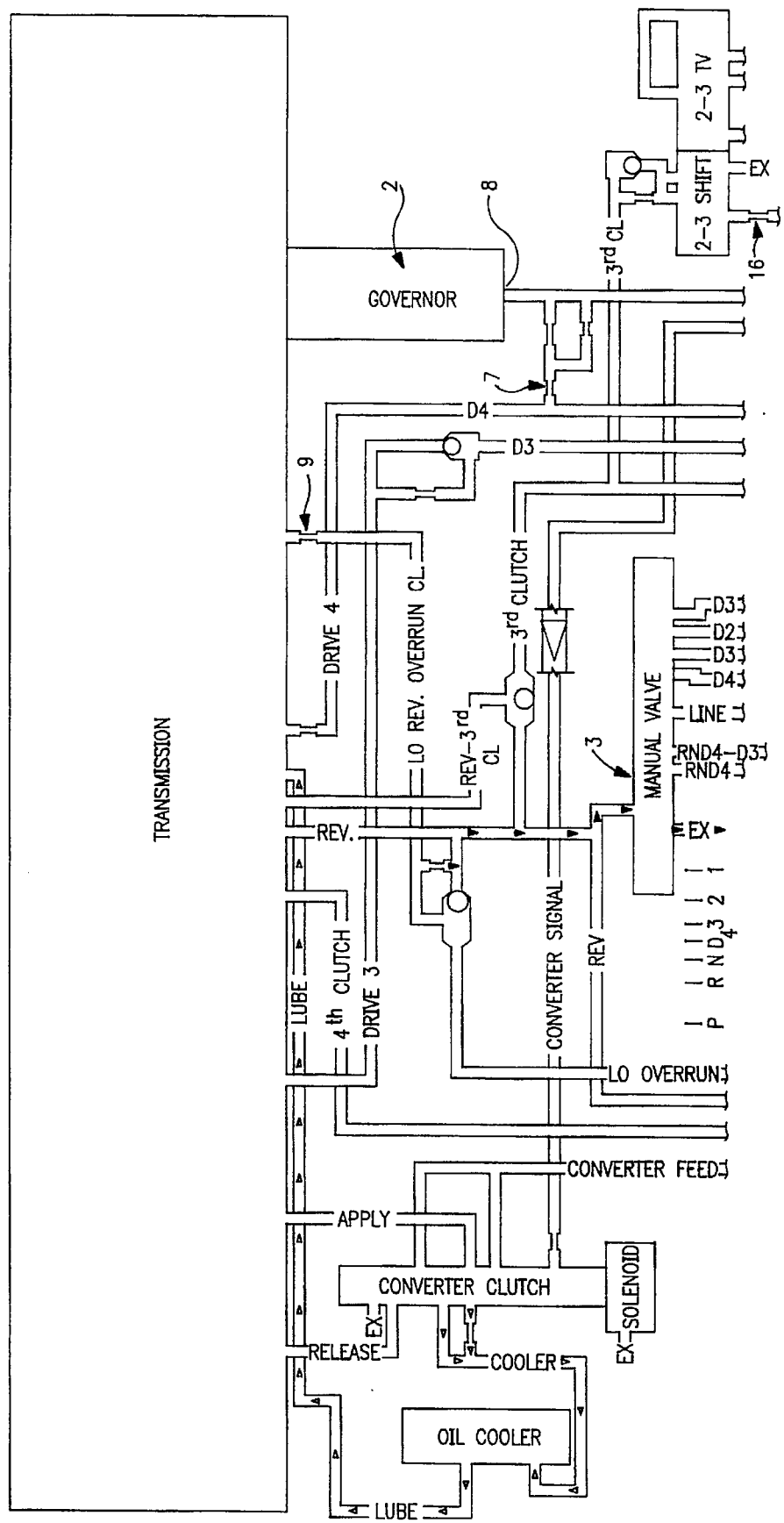

FIGS. 1A–C of the drawings illustrates the modifications and improvements to automotive transmissions in accordance with the present invention for the "Manual Lo" phase of operation, and FIG. 2 of the drawings illustrates the modifications and improvements to automotive transmissions of the present invention for the "Manual Second" mode of operation.

As defined in the aforementioned GENERAL MOTORS® Publication incorporated by reference herein "Manual Lo" is a gear selection which can be selected at any vehicle speed. The transmission will shift to second gear until approximately 30 m.p.h. (48 km/h), at which time it will downshift to first gear. This is particularly beneficial for maintaining maximum engine braking when descending steep grades.

The aforementioned GENERAL MOTORS® publication also defines "Manual Second". Manual Second adds more performance. It has the same starting ratio as Manual Third range, but prevents the transmission from shifting above second gear, thus retaining second gear for acceleration or engine braking as desired. Manual Second can be selected at any vehicle speed.

Overdrive Range is used for all normal driving conditions and maximum economy. Overdrive Range has four gear ratios, from the starting ratio, through direct drive to overdrive. Downshifts to a higher ration are available for safe driving by depressing the accelerator.

Manual Third can be used for conditions such as city driving or trailer towing, where it is desired to use only three gears. This range is also useful for braking when descending slight grades. Operation of the THM 200-4R is equivalent to a THM 200 transmission in Drive Range third gear.

Drive Range is used for all normal driving conditions and maximum economy. Drive Range has four gear ratios, from the starting ratio, through direct drive to overdrive. Downshifts to a lower ratio are available for safe passing by depressing the accelerator.

FIGS. 3A–C and 4A–C, respectively, illustrate the prior art hydraulic circuitry of the automotive transmissions illustrated by FIGS. 1A–C and 2A–C, for "Manual Third" and "Drive Range-Overdrive" operation, prior to the modifications to the hydraulic circuitry illustrated by FIGS. 1A–C and 2A–C. The description and operation of the prior art hydraulic circuitry illustrated by FIGS. 3A–C and 4A–C for the "Manual Third" and "Drive Range-Overdrive" modes of operation is illustrated and discussed in the aforementioned prior art publication entitled "THM 200-R4, PRINCIPLES OF OPERATION, First Edition (1980), published by General Motors Corporation.

As noted above, FIGS. 3A–C and 4A–C of the drawing illustrate, respectively, conventional prior art hydraulic circuitry for automotive transmissions in the "Manual Third" and "Drive Range-Overdrive" phases of operation of a motor vehicle. The darkened channels shown in the respective hydraulic circuits illustrate fluid flow during the different phases of the operation of the automotive transmission, while the lightened channels designate no fluid flow therethrough. The specific modes of operation, including the fluid flow through the respective hydraulic circuits of the drawings illustrated by FIGS. 3A–C and 4A–C, is discussed in the publication entitled "THM 200 R-4, PRINCIPLES OF OPERATION, First Edition (1980), General Motors Corporation, the disclosure of which has been incorporated herein by reference. Moreover, operation of the automotive transmission illustrated by FIGS. 3A–C and 4A–C of the drawing, including the fluid flow through the hydraulic circuits illustrated by the drawings, is conventional, is well known to persons of ordinary skill in the automotive transmission art, and therefore will not be discussed in great detail in the present disclosure which is directed to improvements and modifications to the conventional hydraulic circuitry illustrated by FIGS. 3 and 4.

Figure 2A:
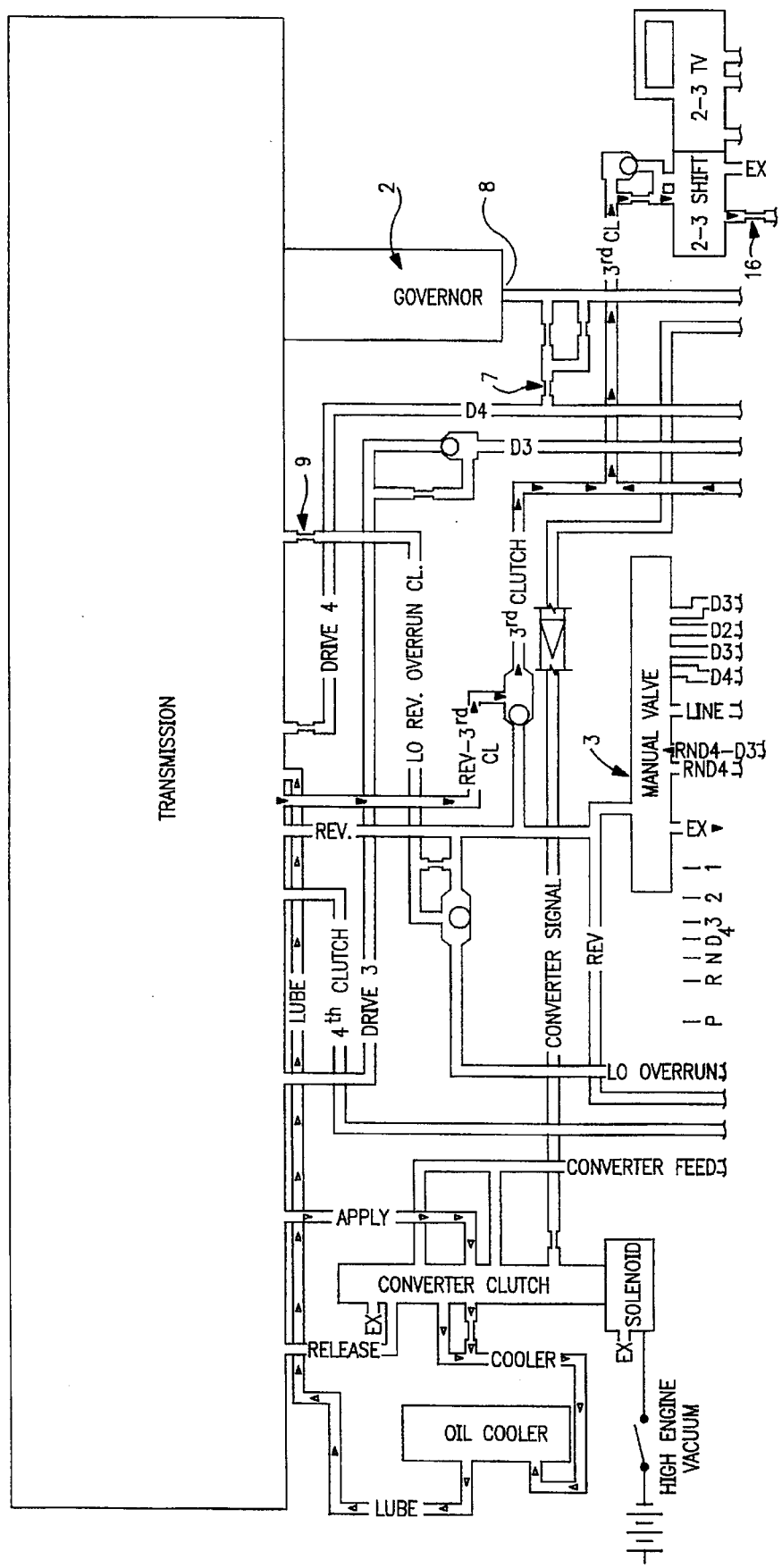
Figure 2C:
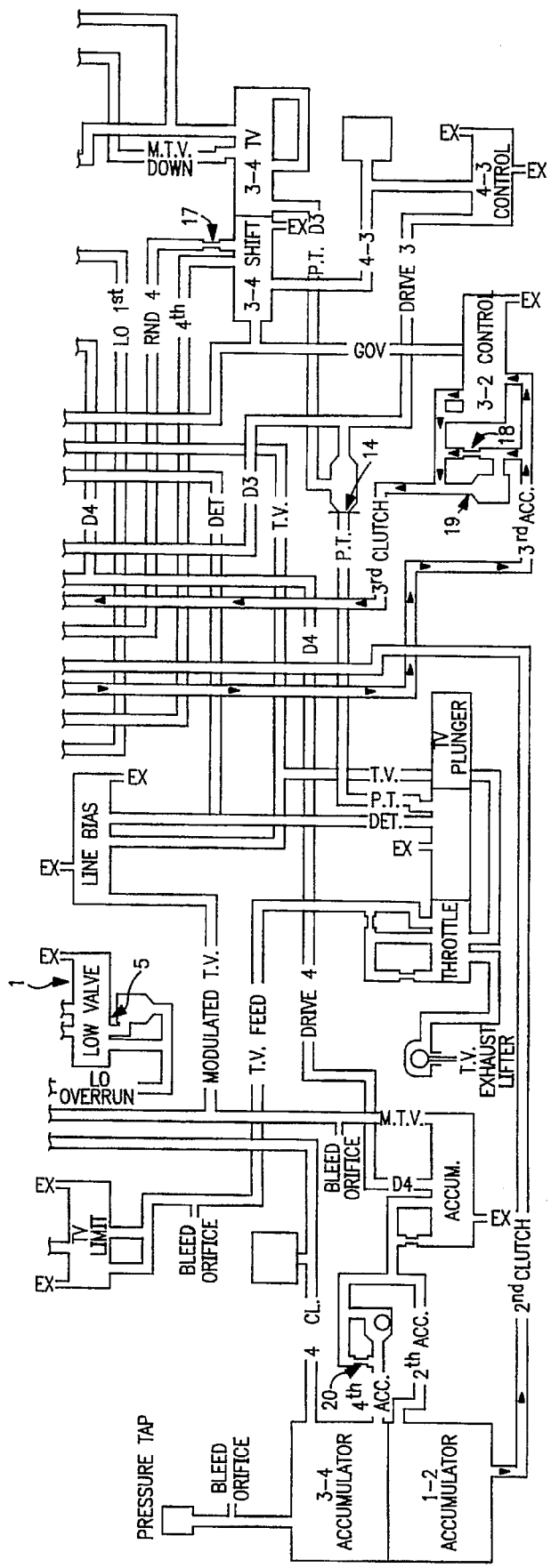
Figure 3A:
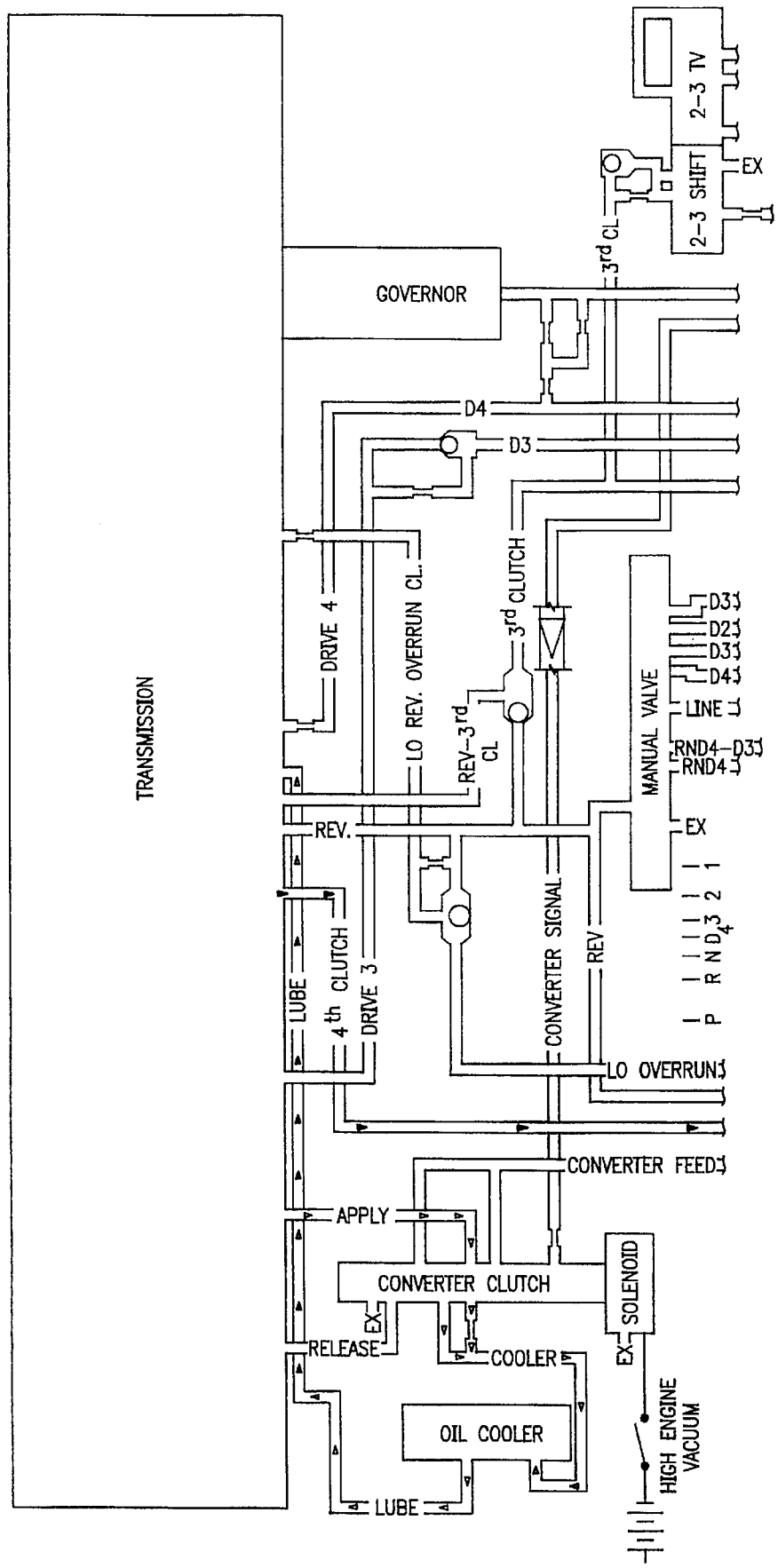
FIGS. 3A, 3B, 3C illustrate the prior art hydraulic circuitry for the "factory installed" "Manual Third" automotive transmission, prior to the modifications in accordance with the present invention.
Figure 3B:
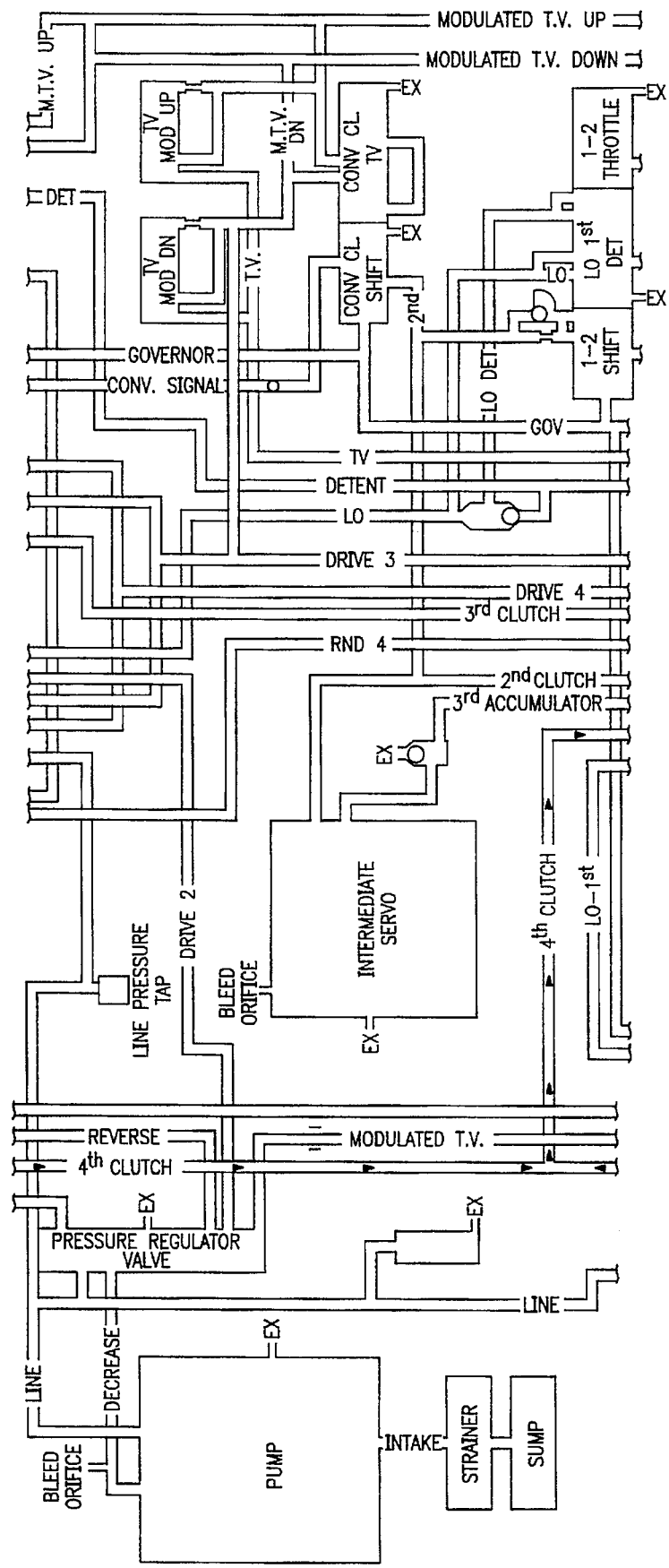
Figure 3C:
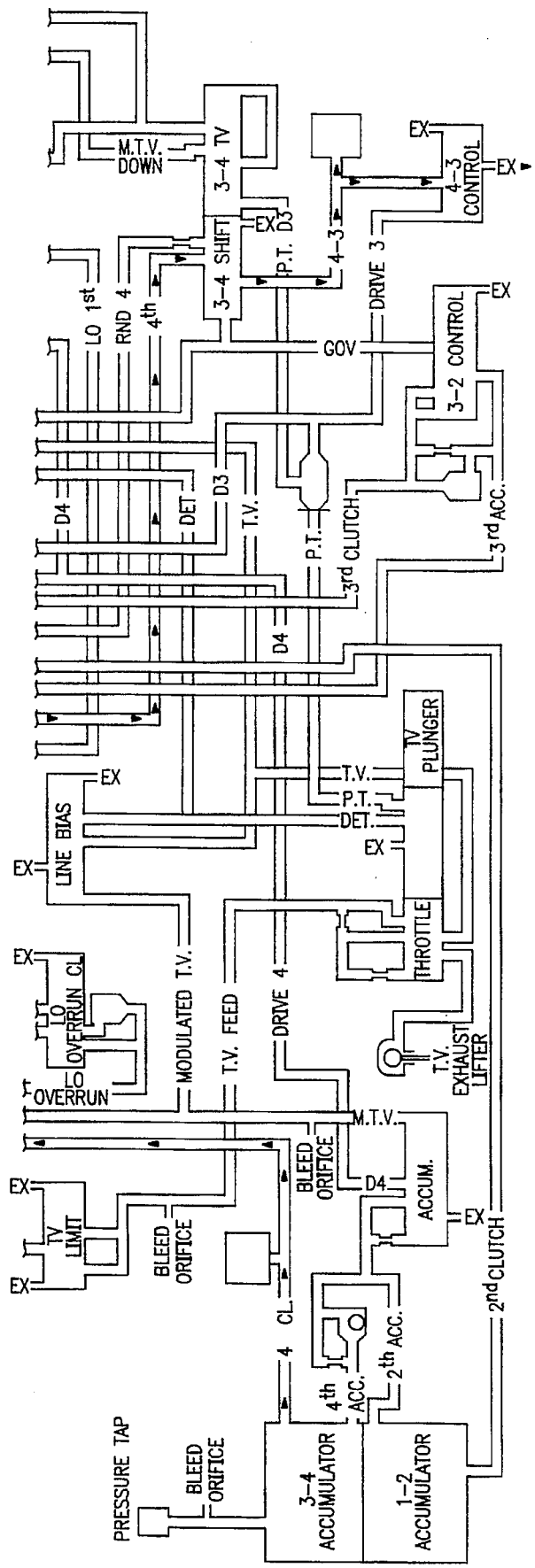
Figure 4A:
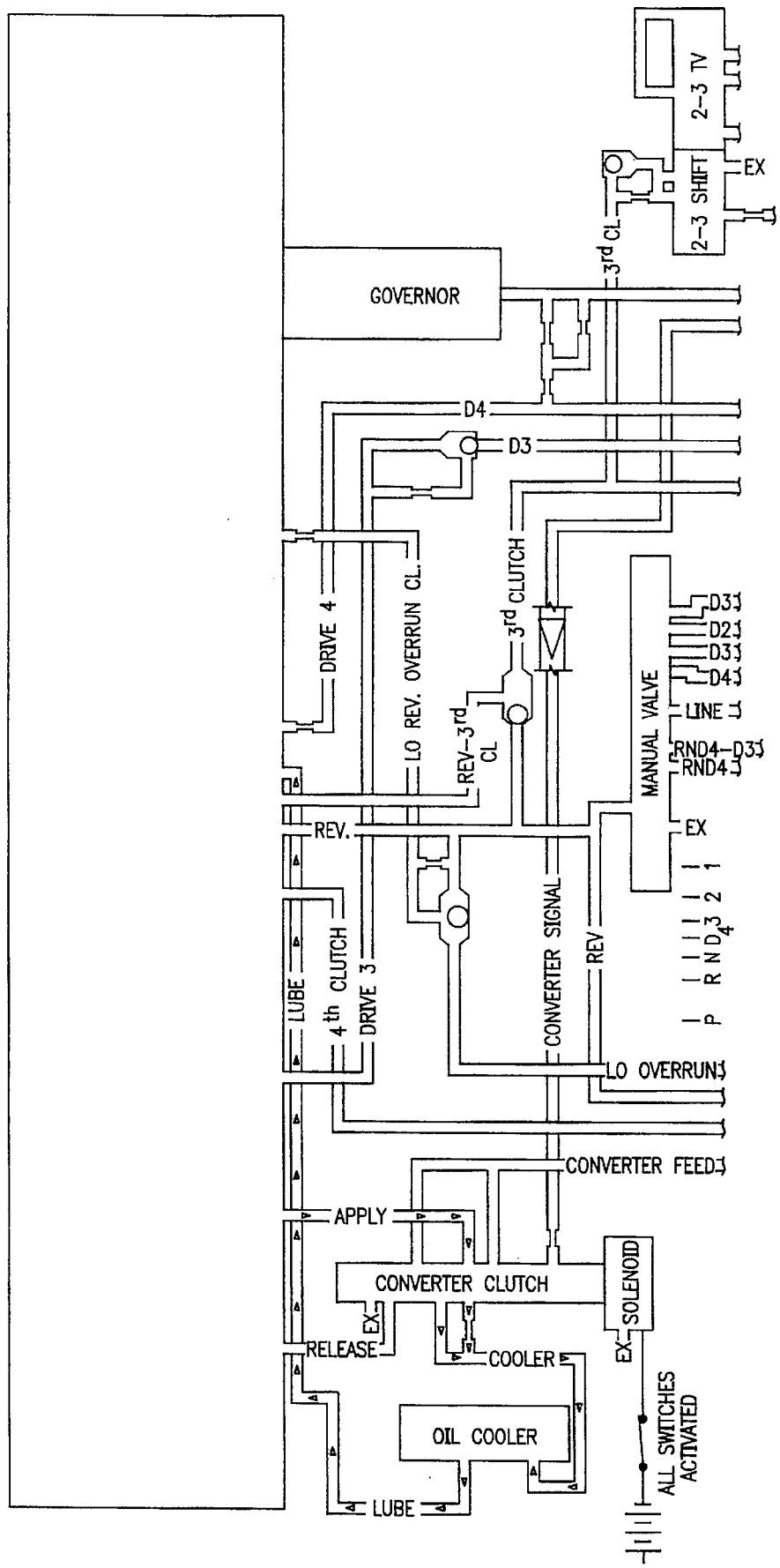
FIGS. 4A, 4B, 4C illustrate the prior art hydraulic circuitry for the "factory installed" "Drive Range-Overdrive" automotive transmission, prior to the modifications in accordance with the present invention.
Figure 4B:
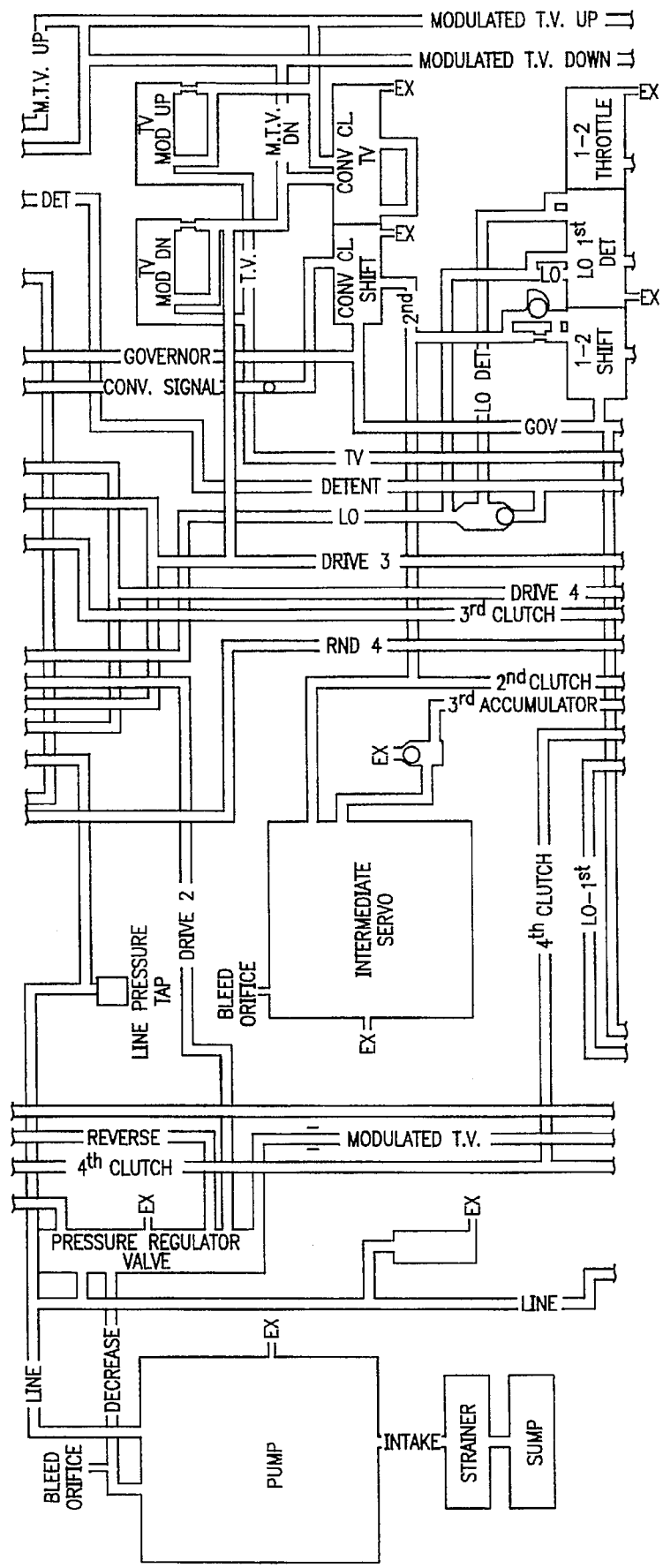
Figure 4C:
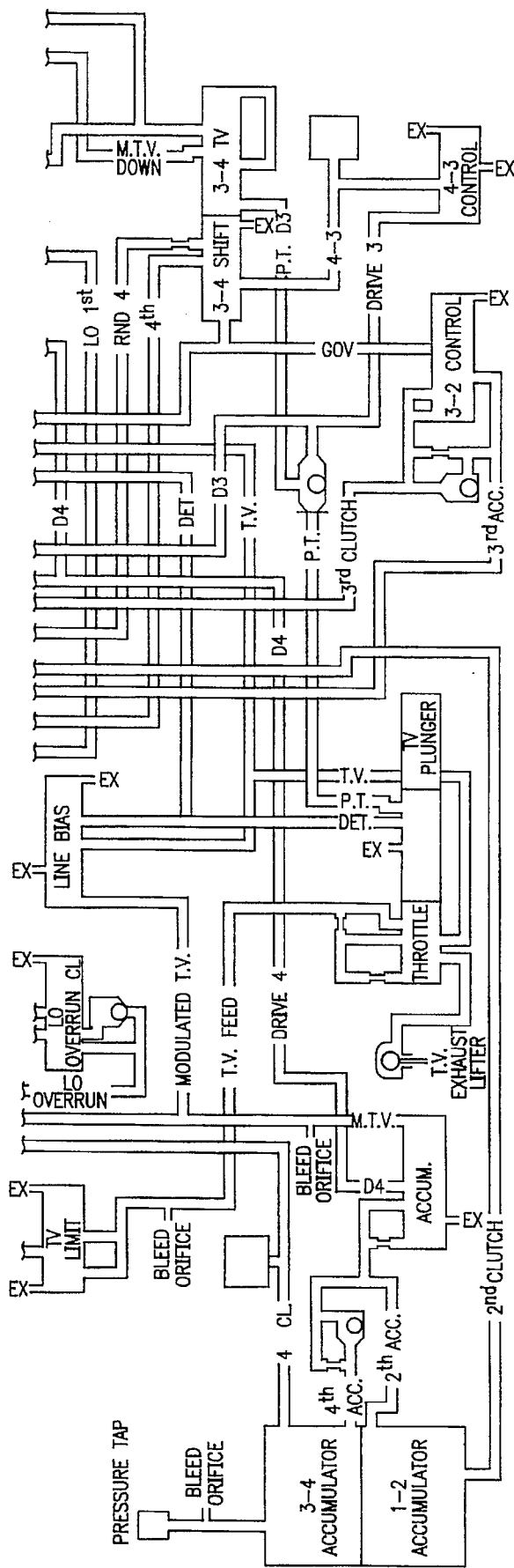

FIGS. 1A–C of the drawing illustrates the hydraulic circuitry for operation of the known automotive transmission in "Manual Lo", as modified in accordance with the present invention. FIG. 2 illustrates the hydraulic circuitry for the known automotive transmission in "Manual Second" as modified in accordance with the present invention. The darkened channels of the respective hydraulic circuits illustrate fluid flow through said channels, while the lightened channels indicate no fluid flow through those channels. A comparison of the hydraulic circuitry of FIGS. 1A–C and 2A–C with that of FIGS. 3A–C and 4A–C, illustrates the preferred embodiments of the specific modifications to the hydraulic circuitry, and the resulting modifications to the fluid flow and operating sequence of the automotive transmission, in accordance with the preferred embodiments of the present invention resulting in the improvements and objectives referred to above. Attention is also invited to the publication entitled "TRANSGO 200/4R-2 & 3 REPROGRAMMING KIT", attached hereto as an Appendix, for detailed instructions directed to transmission mechanics for modification of the hydraulic circuits of the prior art automotive transmission (generally illustrated by FIGS. 3 and 4) to result in the improvements of the present invention illustrated by the hydraulic circuits of the automotive transmissions of FIGS. 1 and 2.

In order to achieve the first objective of the present invention, namely to select any available ratio (i.e., torque multiplying ratio), and not limit the availability of the first ratio only when the vehicle speed does not exceed 28 m.p.h., the "3-2 control valve" illustrated in FIGS. 3A–C and 4A–C of the conventional prior art hydraulic circuits is removed. (See also page 4 of the Appendix). A new low control valve, designated by reference numeral 1 in FIGS. 1A–C and 2A–C of the drawing, is installed as part of the hydraulic circuitry of the automotive transmission. (See also page 5 of the attached Appendix). The governor valve designated by reference numeral 2 in FIGS. 1A and 2A of the drawing, is blocked with a plug (See page 8 of the attached Appendix). New hydraulic circuits are provided by drilling into the valve body casting (See page 4 of the attached Appendix), and pre-existing circuits in the original hydraulic system illustrated by FIGS. 3A–C and 4A–C are discontined by closing selected openings and ports with plugs (See page 6 of the attached Appendix). Preferably, the plugs are formed from a malleable metal, as for example, a malleable aluminum plug which will enable the effective plugging of odd shaped openings in the existing hydraulic circuitry. The addition of new hydraulic circuits to the overall hyrdraulic circuitry, and the discontinuation of pre-existing hydraulic circuits of the originally factory installed transmission by plugging, will be discussed in greater detail as follows.

Still referring to FIGS. 1A–C and 2A–C of the drawing (and to the designated portions of the attached Appendix), a new hydraulic circuit provided for actuating the new low valve 1, is added by drilling an opening to provide a channel for connecting the "low oil" from the Manual Valve (designated as reference numeral 3) to the left end of the newly installed low valve 1. The opening is drilled into the partition at the "1-2 Shift Valve" at the position designated by reference numeral 4. A pre-existing check ball in a manual low circuit coupled to the low valve is removed. By providing the new hydraulic circuit for actuating the new low valve 1, low oil from the manual valve 3 actuates the new low valve 1 when the manual valve 3 is placed in the "1" (low) or first selector position.

When the low valve 1 is actuated, the governor pressure (which holds valves in upshifted positions) is exhausted through a new opening designated by reference numeral 5 drilled in the low valve 1. Simultaneously, low oil is routed from the manual valve 3 to the "1-2" shift valve (illustrated in FIG. 1), causing the "1-2" shift valve to downshift into the "1" low position thereof. The fluid flowing through this new low circuit (between the manual valve 3 and the "1-2" shift valve) is prevented from leaking by plugging the existing hydraulic circuitry at the location where the "low first" line is coupled to the "1-2" shift valve, designated as reference numeral 6 in FIG. 1. (See page 3 of the attached Appendix).

To prevent exhausting a large volume of fluid at the new low valve 1, an orifice (preferably of the size of about 0.063 inches in diameter) is installed in a separator plate of the valve body at the inlet to the governor 2 at the location designated by reference numeral 7 on FIG. 1 of the drawing (See also page 7 of the attached Appendix). The governor oil pressure is the same as the mainline oil pressure in the mode of operation of the transmission as illustrated by FIG. 1 of the drawing. The governor pressure is maintained at the same value as the mainline pressure by installing a tapered plug into the end of the governor valve at the position designated by reference numeral 8. (Also see page 8 of the attached Appendix).

In the "1" or first gear selector position of the manual valve 3, the transmission is not capable of upshifting at the new low valve 1 because the governor pressure is exhausted through the new exhaust opening provided in the new low valve 1 at the location designated by reference numeral 5 of FIG. 1. When the selector lever of the manual valve 3 is moved out of the "1" or first gear (low) selection position, manual low oil is exhausted at the manual valve. The new low valve 1 will now move to the left in FIG. 1, away from a spring acting thereon, to close the exhaust port designated by reference numeral 5. The governor circuit now attains a fluid pressure which equals mainline pressure, resulting in movement of the shift valves to the position selected by the driver via the manual valve, as further illustrated by the hydraulic circuit of FIG. 2 ("Manual Second").

Still referring to the hydraulic circuit illustrated by FIG. 1 of the drawing, a 3/64 inch diameter cotter pin is installed in the separator plate at the area designated by reference numeral 9 to reduce the feed orifice to the low clutch to prevent the transmission from applying the low clutch too rapidly during a manual downshift to first gear. The cotter pin is installed in the line designated as "Lo Rev Overrun Clutch" which is coupled in fluid flow relationship (through a line designated as "Lo Overrun") to the new low valve 1. (Attention is also directed to page 7 of the attached Appendix).

On certain automotive transmission models, a "4-3" downshift always occurs at wide open throttle conditions. Accordingly, it is not possible to obtain fourth gear at all times on the models. In accordance with the present invention, fourth gear may be obtained at any time during the operation of the automotive transmission illustrated by FIGS. 1 and 2 by making the following further revisions to the T.V. circuit of the hydraulic system illustrated by FIGS. 1 and 2 of the drawing in accordance with the present invention. The T.V. pressure at the T.V. Mod. DN and T.V. Mod. UP valves is blocked by installing two solid wound springs as indicated by reference numeral 10. (Also see page 5 of the attached Appendix). In this manner, T.V. fluid pressure is denied to the spring end of said shift valves, which in the original design of the hydraulic system for the automotive transmission prevented a shift to 4th at full throttle operation, to control the occurrence of a shift.

Oil from the "Drive 3" line (D3) is connected into the revised T.V. circuit by flowing in at the spring end of the "T.V. Mod.—DN" and "T.V. Mod.—UP" valves, thereby replacing the T.V. pressure provided in the original hydraulic circuit (FIGS. 3 and 4) of the factory installed transmission. The modified oil flow from line D3 is illustrated by reference numerals 11 and 12. (Attention is also directed to page 4 of the attached Appendix instructing the drilling of 0.110 inch holes through two partitions). To prevent D3 oil flow from exhausing from from the "T.V. Mod. DN and UP" valves, two solid plugs are installed in the valve body at the positions shown by reference numeral 13.

On other transmission models, the PT (part throttle) land area prevented wide open throttle shift to fourth gear. This difficulty is overcome in accordance with the present invention by revising the hydraulic circuit of the factory installed automotive transmission to that illustrated by FIGS. 1 and 2, as follows. An opening is plugged at the location designated by reference numeral 14 in the PT (part throttle) oil line to the "3-4" shift valve, preventing flow of PT (part throttle) oil to the 3-4 shift valve, thereby allowing fourth gear to be obtained when the gear selector lever is moved to the 4th (O.D.) position.

If the driver or operator of the vehicle desires automatic up and down shifts, but wishes to maintain the ability to obtain first gear ratio at any time (and thereby obtain full race firmness), the plug on the governor valve designated as reference numeral 8 is omitted. Additionally, the drilling and plugging operations discussed above, and in particular the installation of the two solid plugs in the valve body shown by reference numeral 13 and the drilling of the two 0.110 inch holes previously referred to herein, are omitted.

The description of the preferred embodiment of the invention thus far has been directed primarily to the modification of the "factory installed" automotive transmissions illustrated by FIGS. 3 and 4 to enable the driver of a vehicle to select any available gear ratio at any time, and not be constrained by the speed at which the vehicle is being driven. A second object of the present invention is to modify the hydraulic circuitry of the factory installed automotive transmissions illustrated by FIGS. 3 and 4 to product quick apply and release forces with minimum ratio sharing (i.e., overlap). These later modifications are particularly useful in connection with racing applications for the vehicle, and generally improve the performance of the transmission, particularly during heavy duty use. The modifications generally are accomplished by enlarging or reducing fluid flow orifices to modify and control the apply and release fluid flows in the hydraulic circuits, and by varying spring and pressure values in the hydraulic system for further modifying and controlling the apply and release fluid flows.

Referring to FIGS. 1 and 2, reference numeral 15 designates the location in which an orifice of 0.083 inches in diameter in the "factory installed" transmission is enlarged to a diameter of substantially 0.110 inches to increase fluid flow to the intermediate servo to provide a quicker (firmer) "1-2" shift. The enlarged orifice at reference numeral 15 is provided in a line coupled to the "1-2" shift valve 6. (Attention is also directed to page 7 of the attached Appendix).

The orifice designated by reference numeral 16, which is 0.070 inches in diameter in a separator plate of the "factory installed" transmission, is enlarged to a diameter of substantially 0.110 inches. Orifice 16 is provided in a line which is coupled in fluid communication with the "2-3" shift valve illustrated in FIGS. 1 and 2 of the drawings, and the enlarged orifice 16 increases fluid flow to the "2-3" clutch to result in quicker release of 2nd gear and quicker apply of 3rd gear. (See also page 7 of the attached Appendix).

Reference numeral 17 designates an orifice which is enlarged from 0.089 inches in diameter in the "factory installed" transmission to a diameter os substantially 0.110 inches. Orifice 17 is provided in a line which is in fluid communication with the "3-4" shift valve as illustrated in FIGS. 1 and 2 of the drawing, and the enlarged orifice 17 increases fluid flow to the front servo to increase the firmness of the "3-4" shift. (See also page 7 of the attached Appendix).

Reference numeral 18 designates an orifice which has been enlarged from point 0.086 inches in diameter in the "factory installed" transmission to a diameter of 0.110 inches. The enlarged orifice 18 is provided in the hydraulic circuit illustrated by FIGS. 1 and 2 to decrease fluid flow to the front servo during a "2-3" shift, while simultaneously increasing the fluid flow to the "3-4" clutch to increase the firmness of the "3-4" shift. Additionally, a pre-existing check ball hole in a separator plate in the "factory installed" transmission is plugged at the position designated by reference numeral 19 in FIGS. 1 and 2. The result of enlarging the orifice 18 and plugging the hole 19 is to reduce the band release orifice from full flow to 0.110 inches at the band release (BR) orifice designated by reference numeral 18. (Also see page 7 of the attached Appendix).

Referring to page 6 of the attached Appendix, four holes are plugged in the separator plate of the "factory installed" transmission with plugs which are designed in the same configuration as the original openings in the plate in the "factory installed" transmission, but the plugs are slightly smaller so that they will expand and completely fill the opening when struck with a hammer. The plugs are intended to be permanently installed in the four openings designated at page 6 of the attached Appendix, and the plugs are provided either to completely discontinue existing hydraulic circuits, or to permit the openings to be re-orificed at sizes differing from the original "factory installed" openings in the plate to adjust the rate of fluid flow from that of the "factory installed" transmission.

Referring to page 8, step 1 of the attached Appendix, washers may be installed in the front servo to reduce compression of the cushion spring for reducing the intermediate band clearance. This adjustment results in a quicker (firmer) "1-2" shift and "2-3" shift.

Referring to page 7, step 1, item 5 of the attached Appendix, a 1/16 inch cotter pin is installed in the orifice of the separator plate for the "3-4" accumulator. In this manner, D4 (Drive 4) oil which is fed to both the governor 2 and the "3-4" accumulator, will not cause a drop in pressure in the governor circuit during a "4-3" downshift as the "3-4" accumulator strokes. Reference numeral 20 illustrates the location in which the cotter pin is installed in the fluid line coupled to the "3-4" accumulator. In operation of the 200-4R transmission, D4 oil is supplied to the governor and the "3-4" accumulator from the same source. (See also page 7 of the attached Appendix).

The specific installation procedure to be followed by transmission mechanics in enlarging the orifices, plugging the lines, and removing the springs, as discussed above, is also discussed and disclosed in the attached Appendix which is incorporated by reference and forms part of the present specification.

The modifications and revisions to the "factory installed" automotive transmissions illustrated by FIGS. 3 and 4 of the drawing, the operation of which is disclosed and described in the aforementioned publication entitled *"THM 200-R4 PRINCIPLES OF OPERATION"*, First Edition (1980), General Motors Corporation the disclosure of which is expressly incorporated by reference herein, results in improvements to the operation of the automotive transmission by varying the fluid flow through the hydraulic circuitry to (1) to enable the operator of the vehicle to select any available ratio at any time regardless of the actual vehicle speed, and (2) produce quick apply and release fluid pressure with minimum ratio sharing (overlap) which is particularly useful for racing applications of the vehicle, and to generally improve transmission performance, particularly during heavy duty use. The improvements are achieved by providing additional hydraulic circuits, eliminating pre-existing hydraulic circuits, adjusting fluid pressure and spring values, and enlarging and/or plugging orifices and fluid flow lines, as discussed herein.

Other improvements and modifications within the scope of the present invention will become apparent to those skilled in the art. Accordingly, the description of the preferred embodiments of the invention herein is intended to be illustrative only and not restrictive of the scope of the invention, that scope being defined by the following claims and all equivalents thereto.

APPENDIX

200/4R-2&3 Reprogramming Kit™
Valve Body, Accumulator & Servo Parts

This kit installs in the vehicle or with the trans on the bench.
This is a performance product for professional installation. It is not a "do-it-your-self" product. It's for the experienced, full time, professional transmission mechanic who is already completely familiar with 200 4R trans repair.

Read enclosed notice thoroughly before installing this kit.

Choose: Stick Shift or Automatic.

Full Race-*Stick Shift:* Manual shift only.
Trans will start off in what ever gear the selecter lever is in.
Will shift to any gear ratio selected, at any speed, by moving the lever.

Full Race-*Automatic:* Will start off in 1st and will shift automatically to the ratio selected by the driver. Will downshift to any ratio, at any speed by moving the selector lever to the ratio desired.

*Some pointers for increasing trans reliability with Stick Shift setup:*
Don't stall the engine in 3rd or 4th.
Don't start-off in 4th, especialy with high stall converter.
Don't use full throttle in 4th at low speeds.

Burnouts:
In water or bleach box: Break it loose in 1st/2nd, then upshift to 3rd.

THESE ARE THE TRANSMISSION RATIOS:
"1st" 2.74    "2nd" 1.57    "3rd" 1.00    "4th" .67
To find top gear ratio, multiply the axle ratio x .67  [Example 3.73 x .67= 2.50]
Other ratios: Axle ratio x trans ratio. [Example 3.73 x 2.74 = 10.22]

TransGo® 2621 Merced Ave, El Monte, CA 91733-1997
Sales office: (818) 443 7456          Technical: (213) 283 4520

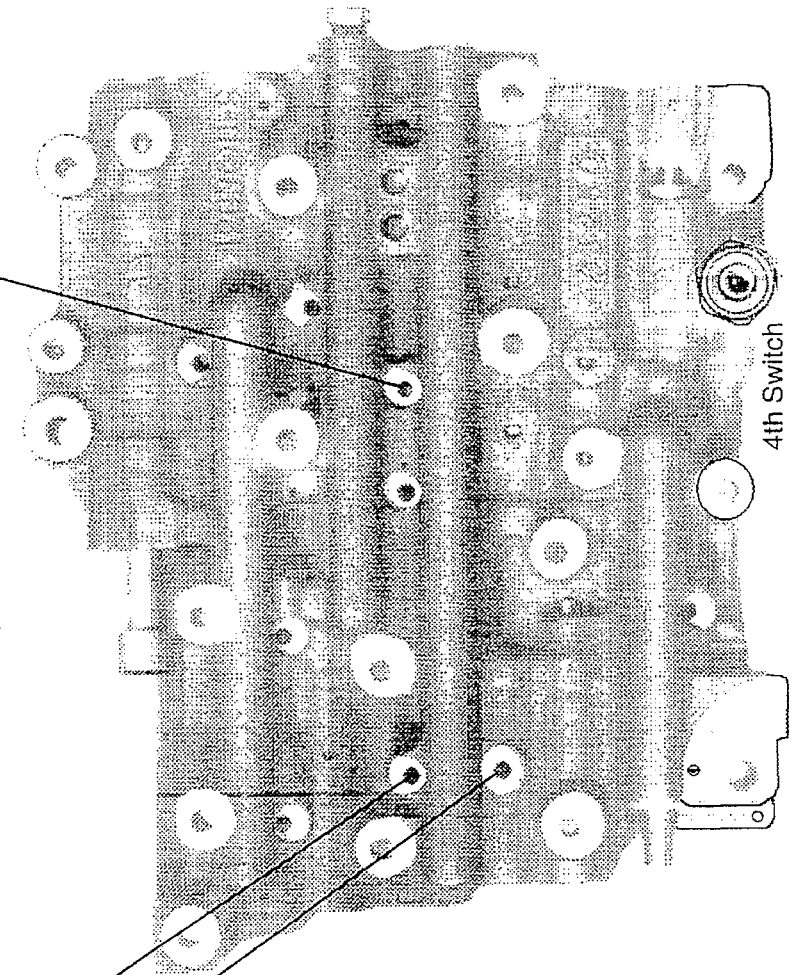

Step 1 Automatic & Stick shift
Install solid plug furnished in this hole

Step 2 Stick Shift ONLY
Install solid plugs furnished in these two holes.

4th Switch

**Lockup Choices:

To retain computer controlled lockup:
Don't drill hole "B" on page 4.
Don't plug hole "1" on page 6.

To retain computer controlled lockup, but have it lockup in 4th only:
Drill hole "B" on page 4.
Plug hole "1" on page 6.

To obtain 4th lockup in vehicle that does not have computer control:
Drill hole "B" on page 4.
Plug hole "1" on page 6.
a. For alltime lockup in 4th, install a checkball in the solenoid.
b. For driver selective lockup in 4th, install a toggle switch in drivers compartment and 12V to solenoid.

If using non-lockup performance type converter: Don't install solenoid. Install 7-CCV valve in pump.

Contents
(3) 73-plg-200 [taper .216 bodyx .197 end.

Page 3

J\4R\pg-3

If the trans is out of the car: To prevent ring breakage and hi-rev pressure drop we reccommend installing the NoYoYo® Hi-Rev hardened steel ring kit. TransGo part number 7-PKH. Your distr has it.

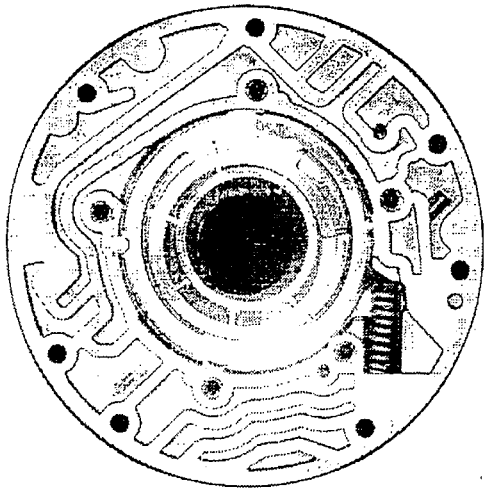

If your are running a non-lock converter: Installing TransGo converter conversion valve [7-CCV] will give performance flow to the converter and lube circuit without any machining of pump or support. TransGo #7-CCV, your parts distr has it.

Step 2: Mic the small land on the Int/Rev valve. If it is smaller than .265 diameter you will need a larger size to produce a firmer manual 1-2 shift. Use GM 8648959 or 8663951 [TransGo #7-296].

Step 3: Install TV boost valve and bushing furnished.

Cont:
7-850-7 [grn PR]
7-500 TV bst valve

Page 2

J:\4r\12

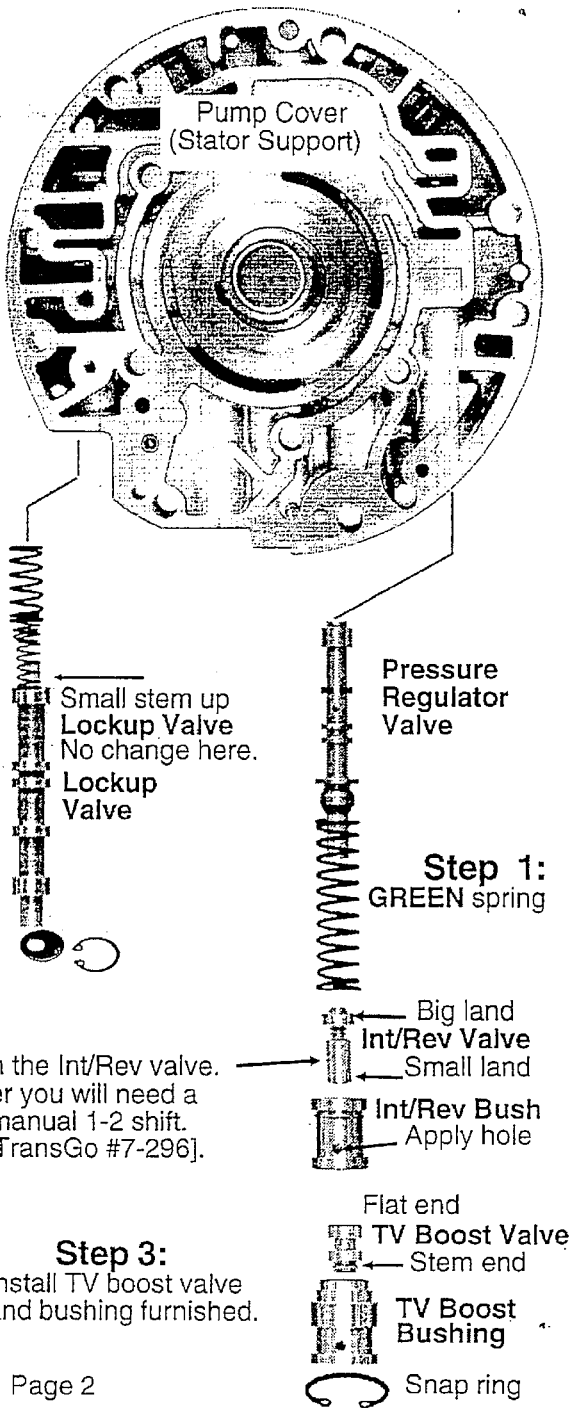

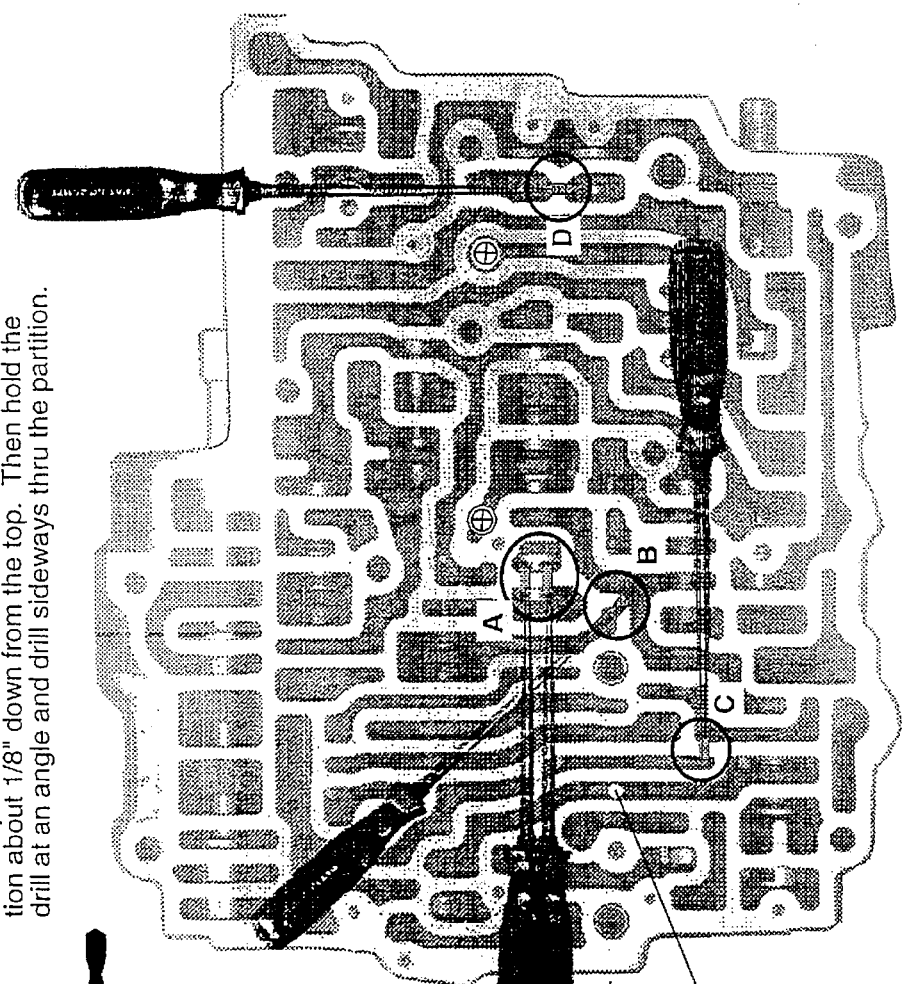

Drilling Circuits

Center punch with an ice pick on the side of the partition about 1/8" down from the top. Then hold the drill at an angle and drill sideways thru the partition.

Drill identification: Actual size is shown

.063
.086
.110
.157

Step 1

Automatic and Stick:
Drill two .110 holes at "A".
If you have chosen 4th lockup drill .110 hole at "B".

Stick ONLY:
Drill .110 hole at "C" and "D".

Step 2

1. Remove original overrun valve. Discard original valve & spring. *Save roll pin & plug.*
2. Center punch in the center of the hump in this passage.
3. With .187 drill, drill straight down thru the passage and out the bottom of the valve body.
4. Reach into the valve bore and deburr the hole. Use a small file, or or fine emery around a pencil.

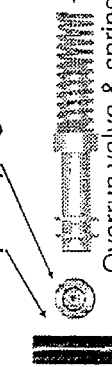

Overrun valve & spring

Drills 1/16--#44--#35--5/32

VB Assembly

9/32" ball--Gold
AC-547S- RED
4R-low-35--Yellow
4R-12-32 yellow
4R-LR-30 solid
4R-LB-55--White
4R-34L-32--Orange
4R-34S-32--Blue
4R-3rd-24-Green
(2)4R-MTV-32-PLN

Step 4: Install White spring on line bias valve.

WHITE Line Bias

MTV up
MTV down

Step 7 *Stick ONLY:* Install solid wound springs on MTV up and MTV down.

Ball Install
When trans is in car.

Install 1/4" checkball here

GOLD .265 checkball here

No Ball here

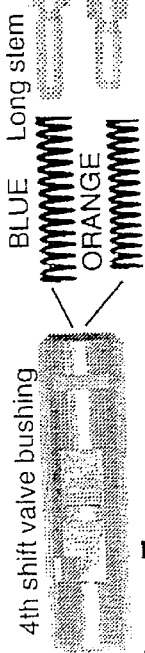

4th shift valve bushing

BLUE Long stem
ORANGE Short stem

Valves are actual size: Install spring that matches the stem on the valve.

Step 5 *Automatic ONLY:* If you want a later 3-4 shift, install new 4th shift spring.

Step 3: Install short solid wound spring on end of low range valve. [No need to remove valve]. Install smaller yellow spring on 1-2 TV valve.

YELLOW
Short solid

Step 6 *Stick ONLY:* Install GREEN spring on the 2-3 TV shift valve.

GREEN

Step 2: Use larger yellow spring and new low valve.

Low valve-YELLOW

Accm Valve RED

Step 1: Install RED spring on accmulator valve.

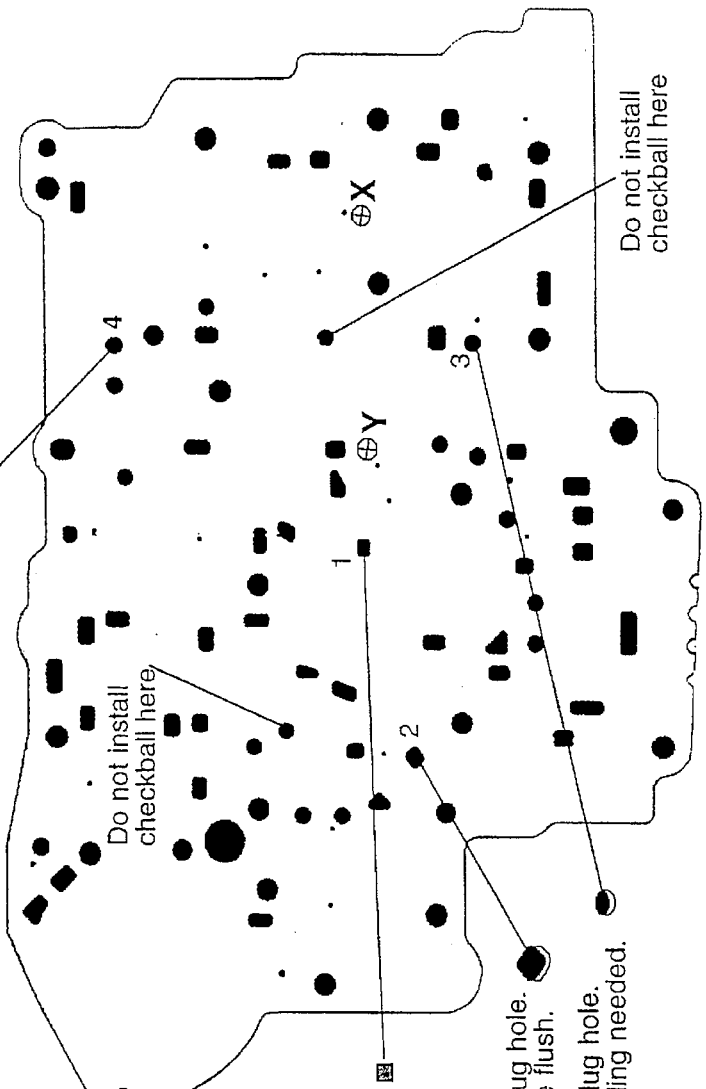

Step 1: Automatic & Stick
1. Hole #1: Plug and file flush.
2. Hole #2: Plug. File flush.
3. Hole #3: Plug. No filing needed.

Step 2: Stick Shift ONLY
Plug hole #4. No filing needed.

If trans is on bench:
"Y" Install Gold checkball
"X" 1/4" ball

Plug holes in plate.
A. *By hand*, use 5/16" or larger drill to make a small chamfer on the hole on both sides of the plate.
B. Place plate on cement floor. Insert plug into hole.
C. While holding the plate down against the floor hit plug 3 to 4 times smartly with *8oz* hammer. Don't kill it.
D. To file plug flush. Use a big file down close to the tang where teeth will still be sharp. Use a new file if possible.

\*\* 1. If hole "B" in VB is drilled [Page 4], plug hole #1 and file both sides flush. If hole "B" is not drilled, don't plug hole #1.

2. PLug hole. File flush.
3. Plug hole. No filing needed.

Cont:
4Rx204x225x59
4Rx178x186x59
(2) Slug-201

Page 6

J\4R\plate.chp

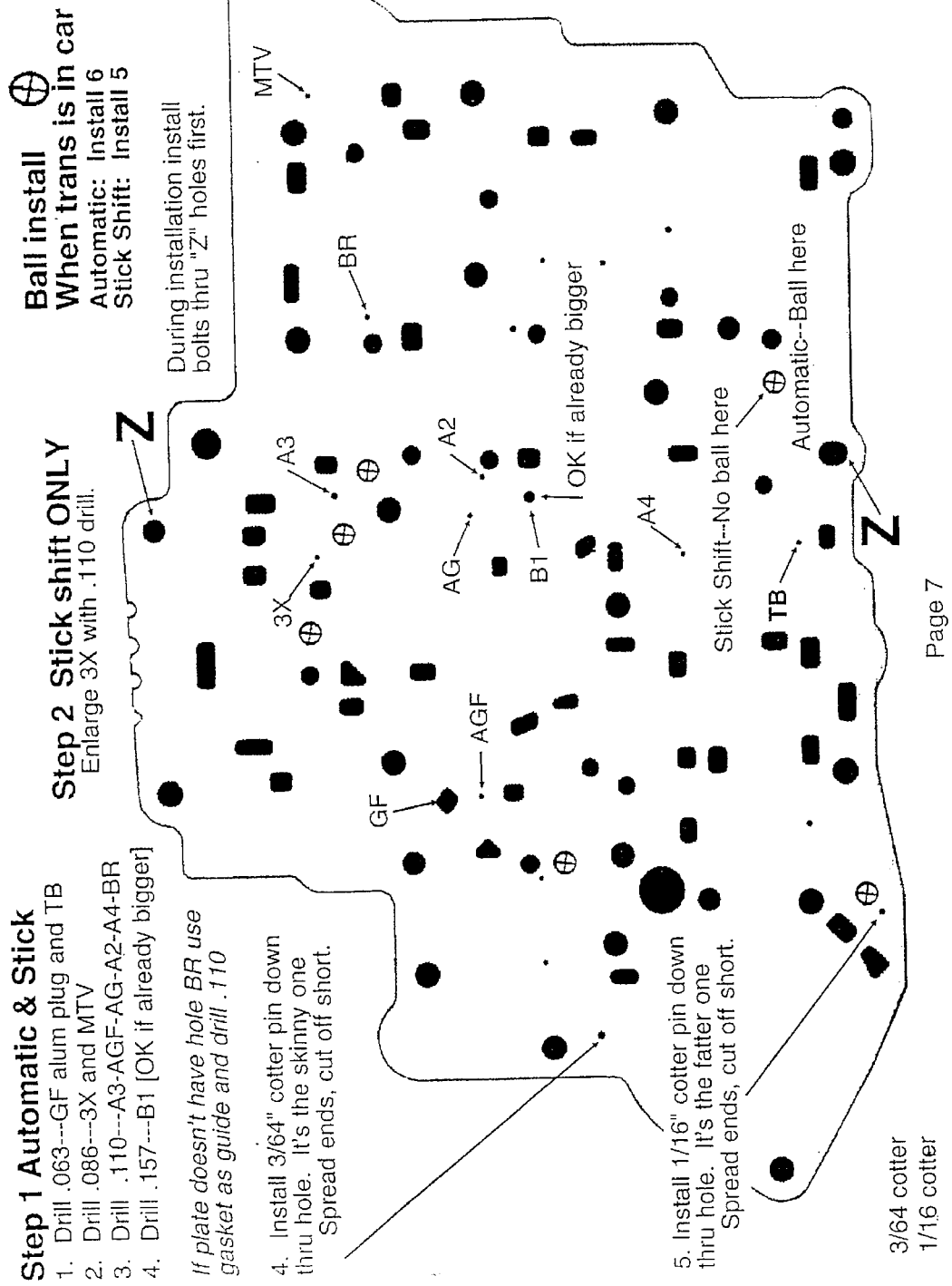

Step 2
Install accm piston into case and then the original spring.

Step 1  2nd Piston
All: Drill orifice in piston with .157 drill. Install cup plug orifice in the hole.
Install WHITE return spring.
Discard plastic ring on 3/2 piston.

Stick: 2 gold washers at "A". 1 at "B".
Automatic: 1 gold washer at "A". 2 at "B"

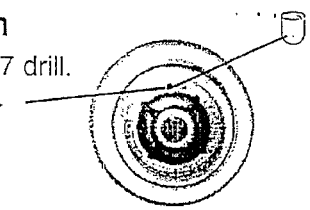

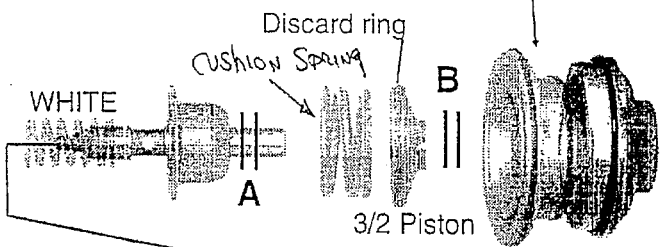

Discard ring
Cushion Spring
WHITE    B
A    3/2 Piston

Step 3
Discard spring under the BIG weight.
Stick only: Install tapered plug into end of Governor.

Plug   Discard Spring

Stick: No ball here

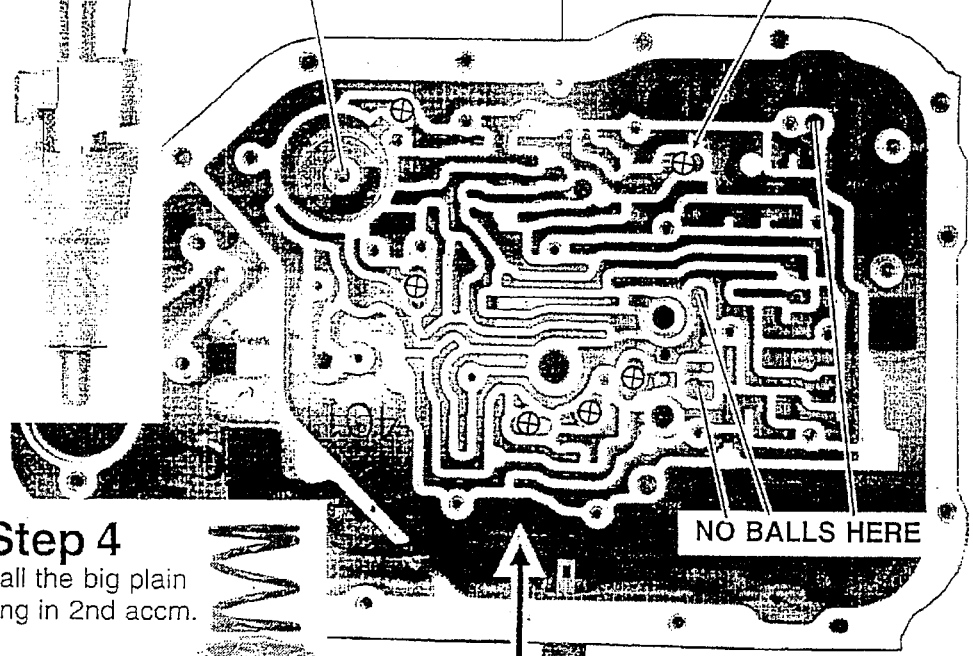

NO BALLS HERE

Step 4
Install the big plain spring in 2nd accm.

Ful-6462
279-SR Wht/Sp
(3)510x60-Wsh
325x066 Wsh
4R-plg-282 plg
2R-AC--Spring

BAND CLEARANCE
Must slide front to rear freely 1/16" or more.

Page 8

Checkballs
With trans on bench
Automatic: Install SIX
Stick: Install FIVE J:\4R\case

I claim:

1. A method for modifying the hydraulic circuitry of an original automotive transmission having a governor, a "3-2" control valve, a "3-4" shift valve coupled in fluid flow relationship with said "3-2" control valve, said "3-4" shift valve and said "3-2" control valve being in fluid communication with said governor, and a manual valve coupled to a gear selector; said method comprising the steps of:

removing said "3-2" control valve from said hydraulic circuitry of said automotive transmission, coupling a low valve in fluid flow relationship to said manual valve such that said low valve is actuated by low oil pressure flowing from said manual valve when said manual valve is moved into a first gear selector position, and adjusting the flow of fluid through said governor such that governor pressure is equivalent to mainline pressure in said hydraulic circuitry.

2. The method of claim 1 wherein said flow through said governor is adjusted by blocking said governor with a plug.

3. The method as claimed in claim 1 further including the method of coupling said low valve in fluid flow relationship to said governor.

4. The method as claimed in claim 3 further including the step of providing an opening in said low valve for exhausting fluid pressure from said governor.

5. The method as claimed in claim 4 further including the step of removing a check ball from a manual low hydraulic circuit coupled to said low valve.

6. The method as claimed in claim 1 including the steps of transmitting low pressure oil from said manual valve, and simultaneously actuating said low valve by low oil pressure when said manual valve is moved into a first (low) selector position.

7. The method as claimed in claim 4 including the step of reducing the volume of fluid exhausted through said opening in said low valve by controlling fluid flow from said governor.

8. The method as claimed in claim 7 wherein said volume of fluid exhausted through said opening in said low valve is reduced by providing an orifice in a line coupled to said governor to reduce the volume of fluid flow from said governor.

9. The method as claimed in claim 8 wherein said orifice in said line coupled to said governor is substantially 0.063 inches in diameter.

10. The method as claimed in claim 1 further including the step of inserting a cotter pin in a line of said hydraulic circuitry to reduce the feed orifice to low clutch for controlling the time duration during which the low clutch is applied during a downshift to the first (low) gear selection position.

11. The method as claimed in claim 1 wherein said hydraulic circuitry of said automotive transmission includes a pair of throttle valves coupled to a throttle valve pressure line, said method further including the step of blocking throttle valve pressure from said throttle valve line into said pair of throttle valves from a 3rd drive line in fluid communication with said manual valve.

12. The method as claimed in claim 11 wherein said throttle valve pressure is blocked by installing a solid spring in each of said throttle valves of said pair.

13. The method as claimed in claim 1 wherein said hydraulic circuitry of said automtove transmission includes a part throttle line in fluid communication with said "3-4" shift valve, said method further including the step of plugging said part throttle line to allow fluid to flow into said "3-4" shift valve to attain 4th gear whenever said gear selector is placed into a 4th gear position.

14. The method as claimed in claim 1 wherein said hydraulic circuitry includes a "2-3" shift valve in fluid communication with said manual valve, said method further including the step of providing a fluid flow orifice having a diameter of substantially 0.110 inches in a line connecting said manual valve with said "2-3" shift valve for increasing fluid flow to a "3-4" clutch.

15. The method as claimed in claim 1 wherein said hydraulic circuitry includes a line coupled to a "1-2" shift valve in fluid communication with said manual valve, said method further including the step of providing an orifice in said line having a diameter substantially 0.110 inches for increasing fluid flow to an intermediate servo.

16. The method as claimed in claim 1 wherein said hydraulic circuitry includes a "3-4" shift valve in fluid communication with said manual valve, said method including the step of providing an orifice in a line coupled to said "3-4" shift valve, said orifice having a diameter of substantially 0.110 inches.

17. The method as claimed in claim 1 including the step of adjusting fluid flow through said hydraulic circuitry by decreasing fluid flow to a front servo during a "2-3" shift while increasing fluid flow to a "3-4" clutch.

18. The method as claimed in claim 1 including the step of feeding fluid to said governor and a "3-4" accumulator coupled to said hydraulic circuitry for avoiding a decrease in fluid pressure in lines coupled to said governor during stroking operation of said "3-4" accumulator.

19. In an hydraulic circuit for an original (200-4R) automotive transmissions including a governor, a "3-2" control valve, and a manual valve coupled to a gear selector, the improvement comprising:

a low valve in fluid flow relationship with said manual valve such that said low valve is actuated by low oil pressure flowing from said manual valve when said manual valve is moved into a first gear selector position, means for operatively removing said "3-2" control valve from said hydraulic circuit, and means for adjusting fluid flow through said governor valve such that governor pressure is equivalent to mainline pressure in said hydraulic circuitry.

20. The improvement as claimed in claim 19 wherein an opening is defined in said low valve for exhausting fluid pressure from said governor, and means are provided for controlling the volume of fluid exhausted from said opening in said low valve.

* * * * *